Sept. 16, 1969 R. J. ROMAN 3,467,341
RIM TRAP FOR PHOTOGRAPHIC FILM PROJECTION CARTRIDGE
Filed Nov. 1, 1966 3 Sheets-Sheet 1

ROBERT J. ROMAN
INVENTOR.

BY
ATTORNEYS

Sept. 16, 1969 R. J. ROMAN 3,467,341
RIM TRAP FOR PHOTOGRAPHIC FILM PROJECTION CARTRIDGE
Filed Nov. 1, 1966 3 Sheets-Sheet 2
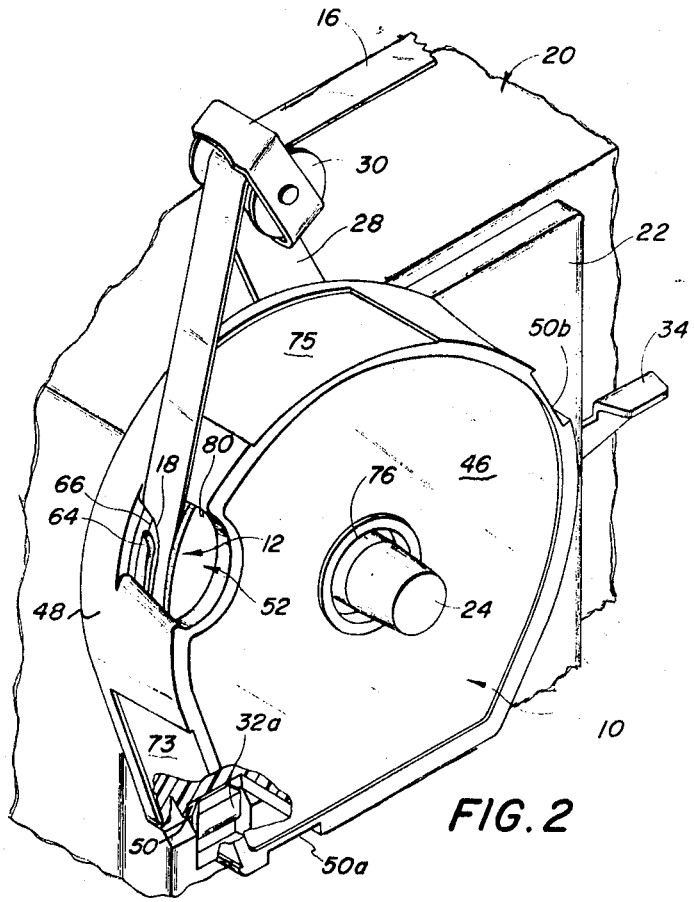
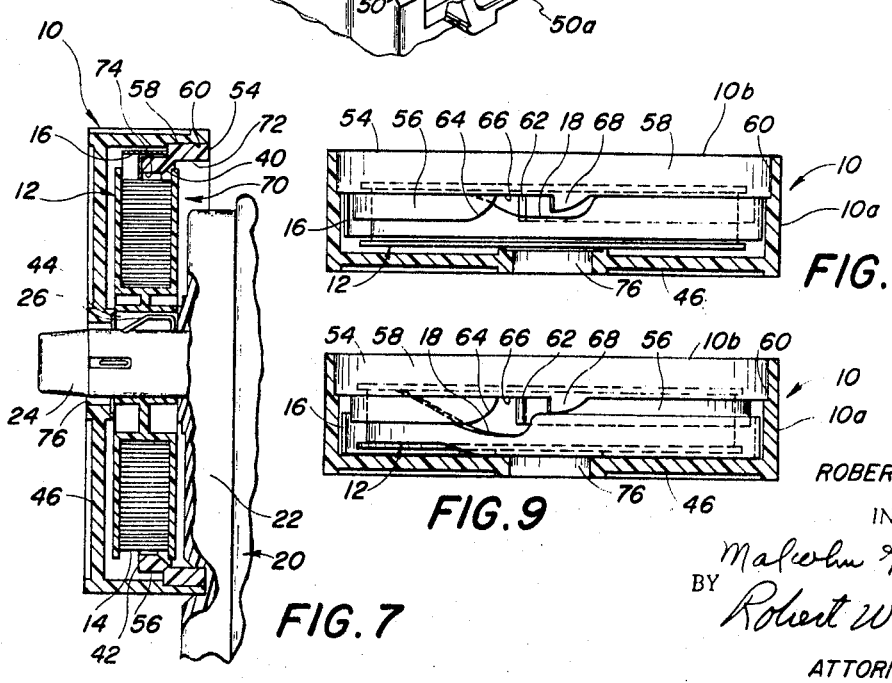
ROBERT J. ROMAN
INVENTOR.
BY Malcolm H. Dunn
Robert W. Hampton
ATTORNEYS Sept. 16, 1969  R. J. ROMAN  3,467,341
RIM TRAP FOR PHOTOGRAPHIC FILM PROJECTION CARTRIDGE
Filed Nov. 1, 1966  3 Sheets-Sheet 3

ROBERT J. ROMAN
INVENTOR.

BY *Malcolm J. Dunn*
*Robert W. Hampton*

ATTORNEYS

United States Patent Office 3,467,341
Patented Sept. 16, 1969

3,467,341
RIM TRAP FOR PHOTOGRAPHIC FILM PROJECTION CARTRIDGE
Robert J. Roman, Rochester, N.Y., assignor to Eastman Kodak Company, Rochester, N.Y., a corporation of New Jersey
Filed Nov. 1, 1966, Ser. No. 591,248
Int. Cl. C11b 15/32
U.S. Cl. 242—197                                11 Claims

ABSTRACT OF THE DISCLOSURE

A cartridge adapted to contain a roll of strip material and adapted to be latched to a motion picture projector or the like includes a rim-trap for supporting and retaining a leading portion of said strip material in such a manner that it can be readily grasped and pulled from said cartridge.

BACKGROUND OF THE INVENTION

Field of the invention

The present invention is directed to a cartridge for receiving and storing a reel of strip material, and preferably to a cartridge for projecting a reel of strip material in a film projector.

DESCRIPTION OF THE PRIOR ART

The use of separate supply and take-up reels on film projectors is well-known. One difficulty that the amateur projectionist has in preparing the projector for viewing a film is the manual handling of the separate reels including threading the film from the supply reel through the mechanism associated for guiding the film to and from the projection gate and connecting the free end of the film to the take-up reel.

Recent advances in the art have eliminated some of this difficulty by providing automatic threading mechanisms on some of the more elaborate models of film projectors that are currently offered commercially; but, there is still the manual handling by the projectionist of at least the film supply reel.

Some other film projectors that are offered commercially use projection cartridges that eliminate manual handling of the film by the projectionist completely except for the manual operation of loading the cartridge on the projector and removing the cartridge after the film has been viewed. This type of projection cartridge carries both supply and take-up reels or a supply-take-up arrangement wherein the film is connected to a reel in an endless loop. A projection cartridge of this construction generally must be loaded in a factory and is sealed so that the endless film loop arrangement including a predetermined amount of slack for effective operation will not be disturbed. A disadvantage of an endless film loop arrangement is that the film either cannot readily or seldom can be reversed for re-viewing any portion of the film, but must be run completely forward through the projector until the desired portion again arrives at the projection gate. Another disadvantage inherent in an endless-loop type of cartridge is that it is difficult to make it reliable in operation because of changes in the coefficient of friction owing to the loss of lubricant, temperature and humidity changes, or physical disturbance of the slack distribution. This is especially true if the film is run rapidly forward through the projector in search for a desired portion of the film. The wear life of such film is usually less than in conventional film projectors; and the usual point of first failure is the splice where the free ends of the film were connected to form the endless loop.

SUMMARY OF THE INVENTION

The projection cartridge of the present invention, although requiring the projectionist to manually lead the free end portion of the film to the automatic threading mechanism of the projector, will facilitate setting up the projector for operation and will avoid the disadvantages of the endless loop projection cartridge mentioned above while incorporating many desirable advantages of that construction in addition to other advantages that will be mentioned including longer wear life of the film.

Some other desirable advantages of the projection cartridge of the present invention include storage and protection of the film when not in use; integrity of the film identification because the film will remain with the cartridge; the film can be run forward and backward in the projector to permit a quick review of an idea contained in a short portion of the film, thus making it possible for the projectionist to move quickly to an interior portion of the film to locate a specific subject matter; the user of the film will be able to do his own loading of film in such cartridge without special equipment, thereby it possible for him to load film that he has taken of his own activities into the same type cartridge as is used with commercial print films; and the storage of film in cartridges will have the advantage of ready identification when the cartridges are stacked in rows on library shelves with the label area on the cartridge being visible in a manner similar to that on a book jacket. Another desirable advantage of keeping film in a projection cartridge that the present invention will have is that from the viewpoint of the custodian of a library of films, there will be more confidence that a film loaned to a classroom, to a business, to industry, or to an individual student will be returned in good condition.

Accordingly, an object of the projection cartridge of the present invention is to trap the film leader in the outer periphery of the cartridge each time the film is rewound in the cartridge so that the projectionist may readily grasp the leader and remove it from the cartridge to insert the leader in the automatic threading mechanism of the projector.

Other objects inherent in the invention will be apparent to those skilled in the art from the drawings, and from the description that follows.

BRIEF DESCRIPTION OF THE DRAWINGS

In the drawings:

In FIG. 2 is shown an enlarged perspective view of the projection cartridge in operative position on a film projector with the slot portion of the film leader positioned at the opening in the outer periphery of the cartridge and with a portion of the cartridge removed at the lower left-hand corner and in cross-section to illustrate one of the latch devices in latched position on the cartridge;

In FIG. 7 is shown a cross-sectional view taken along line 7—7 of FIG. 6 but mounted in operative position on the spindle of a film projector;

In FIG. 8 is shown a cross-sectional view taken along line 8—8 of FIG. 6 and illustrating the leader in the rim trap of the projection cartridge before the leader engages the ramp on the outer surface of the annular rim as the leader rotates around the rim; and In FIG. 9 is shown a view similar to FIG. 8 but illustrating the relative position of the leader to the annular rim after the leader engages the ramp.

DESCRIPTION OF THE PREFERRED EMBODIMENT

The projection cartridge of this invention is designed to readily receive and store a supply reel of film and is provided with a rimmed area in the outer periphery of the cartridge spaced from the reel for trapping the film leader within the rimmed area and preventing the leader from being wound on the reel so that the projectionist may readily grasp the leader through a finger opening in the periphery of the cartridge and remove the leader for insertion in the automatic threading mechanism of the projector.

Although the projector is described as having an automatic threading mechanism, it will be readily apparent to those skilled in the art that the projection cartridge can also be used on film projectors that do not have such mechanisms.

Furthermore, although the cartridge is described as being preferably for containing film for use in a film projector, the principles of the invention would also be applicable in a sound tape cartridge or in other types of cartridges for strip material that is intended to be rewound in the cartridges and that the user would find advantageous to be able to readily grasp the leading portion of the strip material to remove the strip material from the cartridge.

Figure 1:
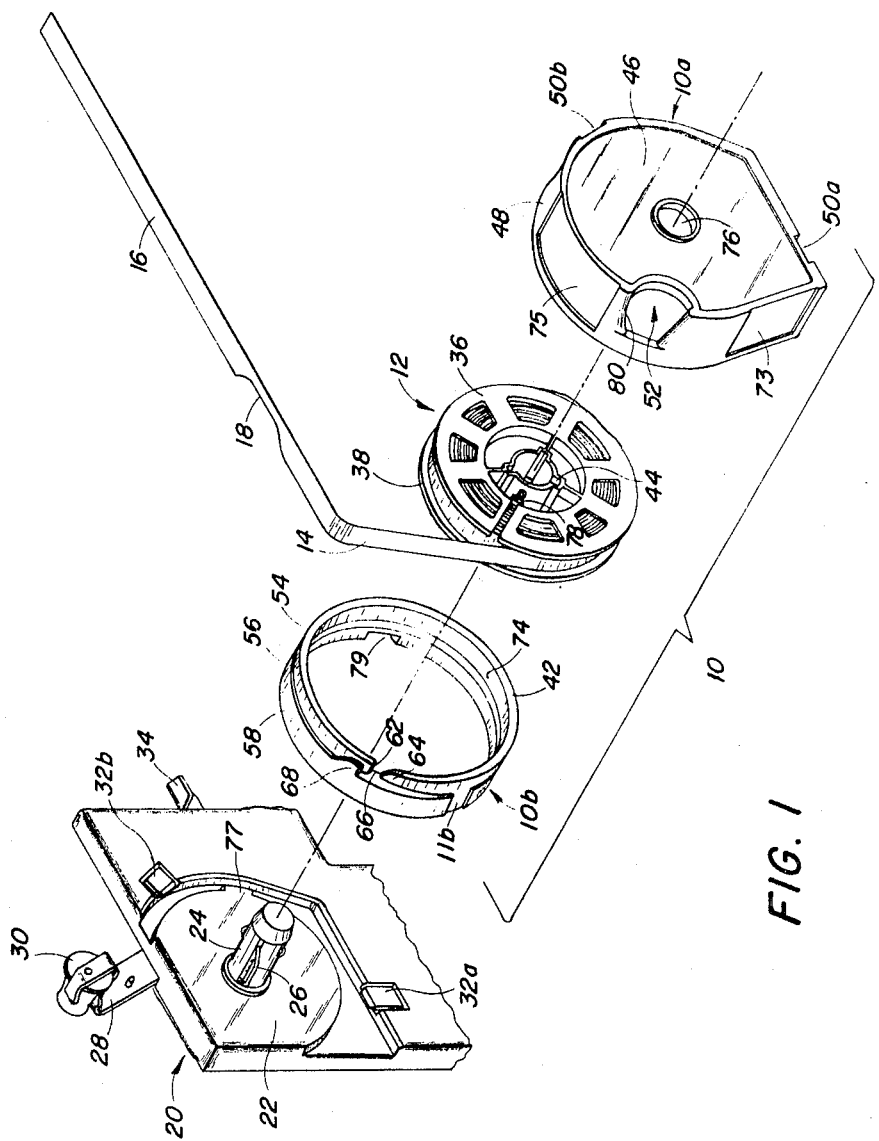
In FIG. 1 is shown a perspective exploded view of parts of the projection cartridge, of a supply reel of film and illustrating a slot in the edge of the film leader extending from the reel, and of that portion of a film projector adapted to receive the cartridge.
Figure 3:
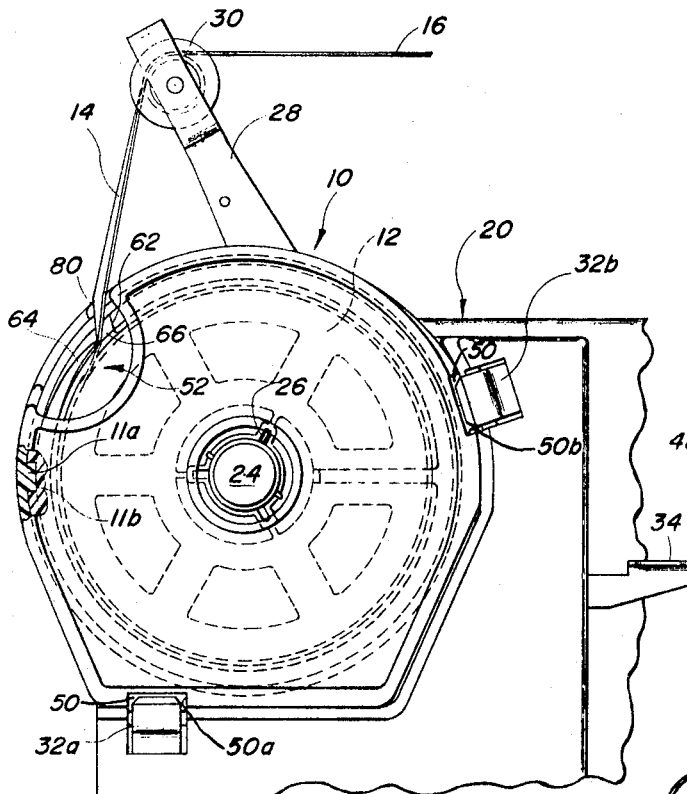
In FIG. 3 is shown a view in elevation of the projection cartridge in operative position on a film projector illustrating the relative positions of the reel and portions of the film and cartridge in dotted lines, in solid lines the latch devices for holding the cartridge on the projector, and with a portion of the cartridge broken away at the left-hand side and in cross-section to illustrate the key and keyway for orienting the inner cartridge piece relative to the outer casing.
Figure 4:
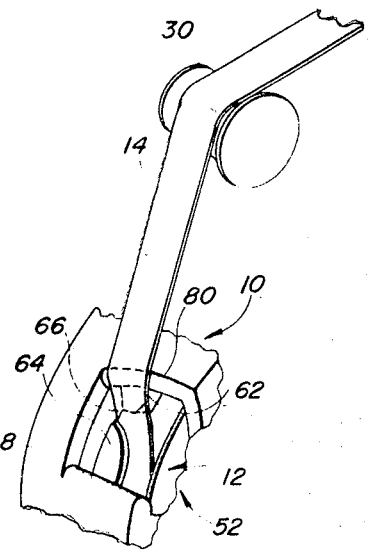
In FIG. 4 is shown a fragmentary portion of the cartridge, annular rim and a flange of the reel with the slot portion of the film leader leaving the area of the slot in the annular rim.
Figure 5:
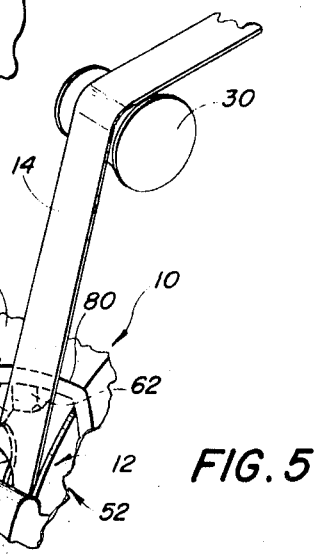
In FIG. 5 is shown a fragmentary portion of the cartridge, the annular rim and a flange of the reel with the forward portion of the film leader and forward shoulder of the slot in the leader being received on the outer surface of the rim while the portion rearward of the slot in the film leader passes below the annular rim for winding on the reel with the leader slot portion bridging in connecting manner the rim and reel areas of the cartridge.

In reference to the drawings, the projection cartridge is indicated generally at 10 and in FIG. 1 wherein the cartridge is shown in two separate parts, the parts are designated in FIG. 1 only for purposes of this description as 10a for the outer casing and 10b for the inner cartridge piece. Both the inner cartridge piece and outer casing are preferably formed from a suitable plastic, and the inner cartridge piece is designed to snap in place within the outer casing in proper oriented position. The outer casing may be provided with a key 11a (FIG. 3) which fits within a keyway 11b (FIGS. 1 and 3) in the inner cartridge piece to facilitate the orientation of one part to the other.

The reel 12 is also preferably formed from a suitable plastic and may be similar in construction and size as a standard fifty foot reel, for example, which is returned with film that has been developed; obviously, however, the cartridge could be made in sizes appropriate to larger reels. The film on the reel is indicated in general at 14, and has a leader 16 with a slot 18 formed in one edge of the leader a predetermined distance from the free end of the leader.

Only the pertinent portions of a film projector necessary to an understanding of the invention are shown since those portions not shown would be coventional; thus that part of the projector that is shown is indicated generally at 20. The projector is provided with a recessed support plate 22 (FIG. 1) for receipt of the projection cartridge; a supply spindle 24 for rotatably supporting the film supply reel 12 in the cartridge; a drive member (not shown) which rewinds the reel by means of the engagement of the spring member 26 on the spindle with the reel; an idler arm 28 and an idler 30 for guiding the film 14 and its leader 16; spring-biased latch devices 32a and 32b for latching the projection cartridge 10 in loaded position on the projector; and a release lever 34 which may not only serve to release the latch devices from the cartridge when the cartridge is to be removed, but also may serve to release the idler arm from its inoperative position (not shown) when the cartridge is to be loaded on the projector so that the arm will rotate counterclockwise to the operative position illustrated in FIG. 1 to 5.

The manner in which the drive member (not shown) operates is more fully described in my co-pending U.S. application Ser. No. 397,451, entitled Automatic Rewinding Mechanism for Film or the Like, filed Sept. 18, 1964 and issued Jan. 24, 1967 as U.S. Patent No. 3,300,155. The construction and operation of the supply spindle 24 and its spring member 26 are more fully described in a co-pending U.S. application Serial No. 591,315, entitled Spindle for Supporting Reels or Spools for Rotation, filed Nov. 1, 1966 by Leslie J. Bunting. The details of the latch devices, idler arm and release lever are more fully described in co-pending U.S. application Ser. No. 591,314, entitled Automatic Latching Mechanism and Film Guide Arm for a Cartridge-Loaded Motion Picture Projector, filed Nov. 1, 1966 by Leslie J. Bunting, now abandoned and refiled Nov. 7, 1967 as continuation application Ser. No. 681,295, and issued July 30, 1968, as U.S. Patent No. 3,394,901.

The plastic reel 12 is double-flanged with the lead flange 36 being preferably more readily flexible than the trailing flange 38 so that the lead flange will be flexed in a lateral direction toward the other flange upon engagement of the lead flange with the annular beveled surface 40 (FIG. 7) of the inner cartridge piece 10b as the reel is snap-inserted in the cartridge 10. The annular surface 42 which defines in effect a chamber for the reel tends to retain the reel in the cartridge unless the reel is intentionally forceably removed, at which time the lead flange will be flexed laterally in the opposite direction away from the other flange when the lead flange is forced against surface 42. The details of this construction are more fully described in my co-pending U.S. application Ser. No. 591,249, entitled Projection Cartridge, filed Nov. 1, 1966.

The reel 12 is provided with drive slots 44 one of which is engaged by the spring member 26 on the projector when the projector has been tripped into a re-wind operation. As stated above, the details of this arrangement are more fully described in a co-pending application.

Rim trap

Figure 6:
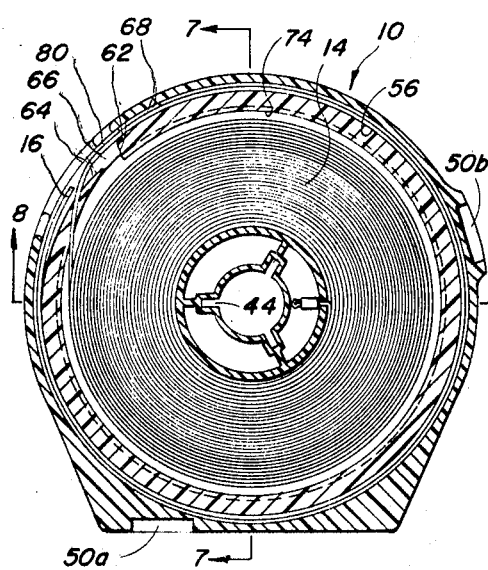
In FIG. 6 is shown a cross-sectional view of the projection cartridge and reel with the film wound on the reel and the leader trapped in the outer periphery of the cartridge.

The outer casing 10a of the projection cartridge 10 is provided on one side with a side wall 46, and a peripheral wall 48 with two recessed surfaces 50a and 50b being formed in the peripheral wall constituting latch locations for locking engagement with the chamfer 50 (FIGS. 2, 3 and 6) at each recessed surface by the latch devices 32a, 32b, respectively. A finger opening 52 is provided in the outer periphery of the outer casing 10a.

The inner catridge piece 10b includes an annular rim 54 having an outer surface 56 for receiving and supporting the leader 16, and a surface 58 for frictionally engaging in assembled relation the inside peripheral surface 60 (note FIG. 7, for example) of the outer cartridge casing 10a.

When the outer cartridge casing 10a and inner cartridge piece 10b are assembled, the annular rim 54 projects toward but is spaced from the side wall 46, and the outer leader support surface 56 of the rim is spaced from the peripheral wall 48 to form a rimmed area in the outer periphery of the projection cartridge 10 outwardly of the area that consitutes a chamber for the reel.

The annular rim 54 is provided with a forward end edge 62 (as viewed in the direction toward which the film will travel to the projection gate) and an after end edge 64, the two end edges defining a slot 66 in the rim for passage of the film to and from the reel 12. A ramp 68 extends laterally from surface 58 part way onto the outer surface 56 of the annular rim 54 at a location forward of the slot 66 for a purpose to be described in the operation of the projection cartridge.

Operation of rim trap

The film projector, which is only illustrated in part, is capable of alternatively receiving conventional separate supply reels of different sizes for different lengths of film on the projection cartridge of the invention. Normally, when the projector operates with conventional supply reels the idler arm 28 and its idler 30 will be disposed in an inoperative position (not shown) out of the way of such supply reels.

Before the reel 12 is inserted in the projection cartridge 10, the leader 16 is manually extended into the cartridge and up through the slot 66 in the annular rim 54 and out through the finger opening 52 in the outer casing 10a. The reel is then moved bodily in an axial direction into the chamber of the cartridge through the opening 70, which is defined by an inner peripheral surface 72 of the inner cartridge piece 10b, until the lead flange 36 of the reel 12 is forcibly snapped past the beveled surface 40 of the inner cartridge piece 10b to be retained in the reel-retention position by annular surface 42. The diameter of the surface 74 of the inner cartridge piece 10b, which surface lies between beveled surface 40 and annular surface 42, is less than that of the reel flanges 36, 38; and the thickness of surface 74 and beveled surface 40 in an axial direction is less than the distance between the facing surfaces of the reel flanges. The leader can then be wound inside the cartridge until it is trapped in the manner that will be described. The cartridge now serves to support and store the reel of film until such time that the film is to be projected, and whatever identification of the film is desired may be labeled (not shown) in either or both the recessed areas 73, 75 on the outside surface of the cartridge, or the recessed area of side wall 46.

When the projection cartridge 10 is to be used, the cartridge is loaded onto the recessed support plate 22 so that the open side of the cartridge faces the support plate, and that the projector spindle 24 extends through the opening 76 formed in the cartridge casing side wall 46.

An additional key 77 (FIG. 1) may be provided on the recessed plate of the projector for fitting within a keyway 79 (FIG. 1) provided on the inner cartridge piece 10b so as to further ensure the proper orientation of the cartridge to the projector, as shown in FIG. 2. The spring-biased latch devices 32a, 32b are engaged and depressed by the chamfers 50 on the cartridge until the latch devices slip over the chamfer into locking engagement. As the latch devices are being depressed, the idler arm 28 and its idler 30 are released from the inoperative position (not shown), and a spring arrangement (not shown) forces the idler to rotate counterclockwise upward into operative position. The idler arm can be manually depressed into inoperative position, and the latch devices can be released from locking engagement by depression of the release lever 34. Also, if desired, the depression of the release lever may cause release of the idler arm so that it will be free to move to operative position. As stated above, the full details of this arrangement are described in a co-pending application.

The projectionist grasps the leader 16 from the outer periphery of the cartridge through finger opening 52 and extends the leader over the idler 30 on idler arm 28 and then into the automatic threading mechanism (not shown) of the projector for subsequent projection of the film. The inner end of the film is preferably held by a clip 78 (FIG. 1) to the reel so that the film will always remain connected to the reel. Thus when the film has been projected, the projector may be arranged to be automatically stopped or automatically tripped into re-wind operation when the film resists further unwinding.

The length of the leader 16 forward of the slot 18 must be such that the end of the leader will be released from the automatic threading mechanism of the projector before the slot 18 arrives at the finger opening 52 in the cartridge.

The narrowed portion of the film leader at the area of the slot 18 serves to connect and bridge the distance between the surface 56 on the rim and the reel 12.

The after end edge 64 in the annular rim 54 is curved, as may be clearly seen in FIGS. 8 and 9, for example. It will also be noted from FIGS. 3 and 6 that the after end edge is tapered in toward the reel so that its surface is lower than the surface of the forward end edge 62.

As the film is being rewound, it passes through the slot 66 in the annular rim, and is caused to bear against the after end edge 64 by the disposition of the idler arm 28 and idler 30 around which the film is guided toward the finger opening 52. As the leader slot 18 commences its engagement with the curved after end edge 64, the film being wound onto the reel pulls in a tangential direction, and it is this tangential direction pulling force coupled with the cooperation of the inwardly curved edge of the slot 18 with the outwardly curved after end edge 64 that results in the reduced width portion of the leader being shunted laterally toward the cartridge side wall and the inwardly curved edge of the slot riding along the outside edge of the annular rim. Since the width of the leader portion that is forward of the slot 18 is greater than the width of the outer surface 56 of the rim the forward leader portion is thus pulled onto the rim outer surface 56 where the leader then rides around the rim while the reduced width bridging portion rides in the area between the edge of the rim and the side wall 46 of the cartridge.

So as to further ensure that the trapped leader portion will not be pulled out of the rimmed area and down onto the reel, the higher surface of the forward end edge 62 assists the trapped leader portion to bridge over the rim slot 66 on each circuit of the reduced width portion of the leader past the rim slot 66. Also, as the inner elge of the trapped leader portion passes by ramp 68, the leader portion is shunted by the ramp so as to still further ensure that the leader portion will not be pulled onto the reel. The advantage of this arrangement will be appreciated when it is realized that it is not necessary to shut the projector off immediately when the rewind operation is completed. If the projectionist is lecturing to a group he may turn the projector off after he has completed making whatever remarks he wished to say to the group while the reel continues to rotate and the leader is trapped for riding around the rimmed area.

In order to protect the surface of the film as the film passes into and out of the cartridge a slight twist is imparted to the film so that only its edges will come into contact with any of the edges defining the film passageway openings. The forward edge of the finger slot 52 is curved, as shown at 80 in the drawings, and the idler arm 28 and idler 30 are slightly disposed inwardly toward the projector relative to the rim slot 66 in the cartridge, all in the manner more fully described in copending U.S. application Ser. No. 591,153, entitled Film Guide Edges on Projection Cartridge, filed Nov. 1, 1966 by Leslie J. Bunting.

The invention has been described in detail with particular reference to the preferred embodiment thereof, but it will be understood that variations and modifications can be effected within the spirit and scope of the invention.

I claim:

1. A cartridge adapted to contain a rotatable roll of motion picture film having a leading end and adapted to be received in a motion picture projector having means for selectively rotating the roll within the cartridge to withdraw film from the cartridge and to rewind the film into the cartridge, said cartridge comprising:

a casing having a peripheral wall and a side wall, said peripheral wall and said side wall cooperating to define a chamber within said casing for rotatably containing the roll; and means on said peripheral wall for trapping and supporting the leading end of the film at said peripheral wall and for guiding the leading end in a circumferential path at said peripheral wall during continued rotation of the roll after the film is rewound into the cartridge.

2. A cartridge adapted to receive a roll of strip material having a leading end and rotatable relative to the cartridge to wind the strip material onto the roll, said cartridge comprising:

a casing defining a chamber for rotatably receiving the roll of strip material, said casing having a peripheral wall and a side wall; and means cooperating with said peripheral wall to define a passageway adjacent to said peripheral wall for trapping and movably supporting the leading end of the strip material radially outward of the roll and for guiding the leading end in said passageway during continued rotation of the roll after the strip material has been wound thereon;

said peripheral wall defining an opening from said passageway to the outside of said casing through which the leading end may be grasped and pulled from said passageway to remove the strip material from the casing.

3. A cartridge as defined in claim 2 wherein said means defines a second opening from said passageway to said chamber through which said strip material is adapted to pass between said passageway and said chamber.

4. A cartridge as defined in claim 2 wherein said means includes a rim positioned within said chamber in spaced relationship with said peripheral wall to define said passageway therebetween and having juxtaposed first and second ends, said first and second ends defining a second opening therebetween through which the strip material is adapted to pass between said passageway and said chamber, one of said ends having means for guiding the leading end into said passageway when the strip material is wound onto the roll.

5. A cartridge as defined in claim 2 wherein said means includes an annular rim positioned within said chamber in spaced relationship with said peripheral wall to define said passageway therebetween and having juxtaposed first and second ends defining a second opening therebetween through which said strip material is adapted to pass between said chamber and said passageway, each of said ends having an outer surface and a curved edge surface for guiding the leading end into said passageway when the strip material is wound onto the roll, the outer surface of one of said ends being spaced radially outwardly relative to the outer surface of the other of said ends for continuously shunting said leading end over said second opening as the leading end moves in said passageway.

6. In a cartridge adapted to rotatably contain a roll of strip material having a leading end, the cartridge including a casing having two sides and a peripheral portion between said sides, said peripheral portion and said sides cooperating to define a chamber within said casing for rotatably receiving the roll of strip material, an opening in said casing extending from outside said casing into said chamber through which the strip material is adapted to pass between said chamber and the exterior of said casing, the combination comprising:

means in the outer peripheral portion of said casing for trapping and rotatably supporting the leading end radially outwardly of the roll when the roll is in the chamber, said means including an annular rim within the chamber and projecting from one of the sides toward the other of the sides, said rim having an outer surface on which said leading end is adapted to be rotatably supported and retained radially outwardly of the roll when the roll is rotated in said chamber;

said annular rim having surfaces adjacent to the opening for guiding the strip material into said chamber and for guiding the leading end onto said outer surface of said rim.

7. A cartridge adapted to enclose a flanged reel containing motion picture film having a leading end, whereby the reel is selectively rotatable relative to the cartridge in a film winding or a film unwinding direction, comprising:

a casing defining a chamber for receiving the reel, said casing further defining an opening therein through which the film is adapted to pass into and out of said chamber from outside said casing, and means in the outer peripheral portion of said casing and radially outward of said reel flanges for trapping the leading end and for preventing the leading end from being wound onto said reel upon continued rotation of the reel in a film winding direction to thereby rotatably support the leading end outwardly of the reel flanges in a position to be accessible through said opening.

8. A cartridge for containing a roll of strip material having a leading end and adapted to be mounted for rotation relative to said cartridge in a direction to wind film onto the roll, said cartridge comprising: a casing having an outer peripheral portion and defining a chamber for rotatably receiving the roll of strip material, means defining an annular rim for trapping and rotatably supporting said leading end radially outward of the roll when the roll is rotated in a direction to wind film thereon, and means defining an opening in said casing through which said leading end may be grasped and removed from said trapping and supporting means.

9. A container for a roll of strip material rotatable in a direction to wind film thereon and having a leading portion with a recess in one edge thereof a predetermined distance from the end of the leading portion, said container comprising: a casing defining an outer peripheral portion and a chamber adapted to rotatably contain the roll, and means including an annular rim in the outer peripheral portion of said casing cooperative with the leading portion adjacent to the recess for catching the leading portion when the roll is rotated in a direction to wind film thereon and for rotatably supporting and retaining the leading portion radially outward of the roll.

10. A container as defined in claim 9 wherein said casing includes an opening through which the leading portion may be grasped to be pulled out of said container.

11. A container as defined in claim 9 wherein said annular rim has first and second ends defining an interior opening through said annular rim and into said chamber through which said strip material is adapted to pass into and out of said chamber, one of said ends having a curved edge surface cooperative with the leading portion adjacent to the recess for guiding the leading portion past said interior opening.

References Cited

UNITED STATES PATENTS 2,213,776 9/1940 Walter _____ 242—71.1
3,006,650 10/1961 Ellmore.

WILLIAM S. BURDEN, Primary Examiner